(12) United States Patent
Lee

(10) Patent No.: US 6,544,661 B1
(45) Date of Patent: Apr. 8, 2003

(54) COMPOSITIONS OF POLYOLEFIN AND POLYVINYL ALCOHOL, AND FILMS, SHEETS AND ARTICLES PROCESSED THEREFROM AND MULTILAYER PRODUCTS USING THE SAME

(75) Inventor: Dong Kweon Lee, 873-147 Anyang 3-dong, Manan-ku, Anyang-shi, Kyungki-do 430-013 (KR)

(73) Assignees: Dong Kweon Lee, Kyungki-Do (KR); Chan Hee Won, Kyunggi-Do (KR)

( * ) Notice: Subject to any disclaimer, the term of this patent is extended or adjusted under 35 U.S.C. 154(b) by 0 days.

(21) Appl. No.: 09/647,565

(22) PCT Filed: Apr. 12, 1999

(86) PCT No.: PCT/KR99/00173

§ 371 (c)(1),
(2), (4) Date: Nov. 17, 2000

(87) PCT Pub. No.: WO99/54400

PCT Pub. Date: Oct. 28, 1999

(30) Foreign Application Priority Data

Apr. 20, 1998  (KR) .............................................. 98-13979
Apr. 20, 1998  (KR) .............................................. 98-13980

(51) Int. Cl.[7] .......................... B32B 27/30; C08L 29/04
(52) U.S. Cl. ..................... 428/522; 428/520; 428/910; 525/57
(58) Field of Search ........................... 525/57; 428/500, 428/520, 522, 366, 637, 910

(56) References Cited

U.S. PATENT DOCUMENTS

| | | | |
|---|---|---|---|
| 3,148,202 A | 9/1964 | Cox et al. ..................... 260/453 |
| 3,365,413 A | 1/1968 | Monaghan et al. ......... 260/33.2 |
| 3,975,463 A | 8/1976 | Hirata et al. ............. 260/897 B |
| 3,997,489 A | 12/1976 | Coker ................... 260/28.5 R |
| 4,206,101 A | 6/1980 | Wysong .................... 260/23 R |
| 4,244,914 A | 1/1981 | Ranalli et al. .............. 264/515 |
| 4,575,532 A | * 3/1986 | Schmukler et al. .... 264/171.28 |
| 4,611,019 A | 9/1986 | Lutzmann et al. .......... 524/169 |
| 4,672,082 A | 6/1987 | Nakagawa et al. ......... 523/153 |
| 4,937,284 A | * 6/1990 | Bergstrom .................... 525/57 |
| 5,051,222 A | 9/1991 | Marten et al. .............. 264/143 |
| 5,317,052 A | 5/1994 | Ohba et al. ................. 524/413 |
| 5,498,665 A | * 3/1996 | Schulze et al. ............ 528/196 |
| 5,641,833 A | * 6/1997 | Jung et al. .................... 525/57 |

FOREIGN PATENT DOCUMENTS

| | | |
|---|---|---|
| EP | 0015556 | 9/1980 |
| EP | 0152180 | 8/1985 |
| EP | 0177762 | 4/1986 |
| EP | 0187040 | 7/1986 |
| EP | 0247326 | 12/1987 |
| EP | 0255733 | 2/1988 |
| EP | 0275900 | 7/1988 |
| EP | 0280455 | 8/1988 |
| EP | 0389695 | 10/1990 |
| EP | 0415357 | 3/1991 |
| EP | 0518348 | 12/1992 |
| WO | 9012061 | 10/1990 |

* cited by examiner

*Primary Examiner*—D. Lawrence Tarazano
(74) *Attorney, Agent, or Firm*—Ladas & Parry (57) ABSTRACT

A composition including a mixture of 1 to 80% by weight of polyolefin and 20 to 99% by weight of polyvinyl alcohol; based on 100% by weight of the polyolefin, 3 to 40% by weight of high molecular compatibilizer and/or 0.1 to 5% by weight of low molecular compatibilizer and 0.01 to 0.5% by weight of initiator; based on 100% by weight of the polyvinyl alcohol, 3 to 50% by weight of plasticizer, 1 to 10% by weight of processing auxiliary agent and 0.01 to 5% by weight of antioxidant. Also, films, sheets and processed articles having barrier properties against gases and organic solvents, manufactured by melt processing the composition; and multi layer articles using the same. These films, sheets and molded articles can maximize barrier properties against gases and organic solvents due to the unique morphology of polyolefin and polyvinyl alcohol, and also show water resistance and mechanical properties of polyolefin.

13 Claims, 2 Drawing Sheets

COMPOSITIONS OF POLYOLEFIN AND POLYVINYL ALCOHOL, AND FILMS, SHEETS AND ARTICLES PROCESSED THEREFROM AND MULTILAYER PRODUCTS USING THE SAME

BACKGROUND OF THE INVENTION

1. Field of the Invention

The present invention relates to compositions of polyolefin and polyvinyl alcohol which can be utilized in forming a multi layer article, and to a film, a sheet and a processed article having excellent barrier properties against gases and organic solvents. More specifically, the present invention relates to compositions which are prepared by adding a prescribed amount of a compatibilizer, an initiator, a plasticizer, a processing aid and antioxidant into polyolefin and polyvinyl alcohol, and to a film, a sheet, a processed article or a multi layer product manufactured with the composition by conventional melt processing methods. The resulting melt extruded pellets form a unique morphology which exhibits all of the properties of each polymer existing in the composition.

2. Background of the Invention

Polyvinyl alcohol is known to have excellent barrier properties against gases and organic solvents. However, methods for manufacturing products by using polyvinyl alcohol have been greatly limited due to many processing problems. To solve these problems, the blending or the modification with other polymers has been attempted. However, it is very difficult to manufacture a composition which can be melt-processed by a conventional thermoplastic-processing method and sufficiently retain the excellent barrier properties of polyvinyl alcohol in the products.

For these reasons, in the prior art, the mixture of polyolefin and polyvinyl alcohol was generally used in the field using hydrophilic properties of polyvinyl alcohol rather than in the field of multi layer products having barrier properties. As such an example, the mixture of polyolefin and polyvinyl alcohol has been used either to manufacture electrically conductive plastic articles or as a drying agent for batteries. The mixture has been mainly used as a sizing agent for fibers or paper surfaces and adhesives (paper, plywood, non-woven fabric, etc.). It has been also used as a reinforcing fiber to enhance the strength of cement or as a dispersing stabilizer in emulsion polymerization.

To utilize the excellent barrier properties of polyvinyl alcohol against gases and organic solvents, the techniques wherein polyvinyl alcohol is melted and then processed to form a film have been reported in numerous patents. In the following, we will summarize the content of several patents; however, it should be noted that all methods set forth below do not necessarily make it possible to melt polyvinyl alcohol completely for it to be processed into articles freely. Furthermore, the methods are far from utilizing the excellent barrier properties of polyvinyl alcohol against gases and organic solvents to an extent which would achieve marketability.

U.S. Pat. No. 3,365,413 discloses an invention using polyvinyl alcohol in a blow extrusion. In the invention, the inventor made acetate to work as a plasticizer by keeping the content of acetate from 25 to 40% by weight in the polymerization of polyvinyl alcohol and lowered the melting point of resin.

U.S. Pat. No. 3,997,489 discloses a method for improving melt processing properties by adding low molecular weight oil or wax. U.S Pat. No. 4,206,101 discloses soluble films which are rapidly and completely soluble in water by melt extrusion using 5 to 20 parts by weight of a polyethylene glycol in 100 parts by weight of a polyvinyl alcohol.

U.S. Pat. No. 4,244,914 discloses a process for plasticizing polyvinyl alcohol with water, and heating under pressure to bring it to the prastisol state, removing the created vapors using an extruder vent, and preparing coextruded multi layer articles. U.S. Pat. No. 4,611,019 discloses a melt extrudable composition by adding polyvinylamide or polyester as a plasticizer into a polyvinyl alcohol.

U.S. Pat. No. 4,672,082 provides a method for producing articles made from polyvinyl alcohol in the state of substantially water-free non-hydroxyl plasticizer but it has a problem in that the cooling rate must be sufficiently slowed to improve the barrier property.

U.S. Pat. No. 5,317,052 discloses a technology which makes melting process possible by adding a metal compound to polyvinyl alcohol and thus raising its thermal decomposition temperature. European Patent 0 415 357 and U.S. Pat. No. 5,051,222 provide a method for producing gel-free thermoplastic polyvinyl alcohol by remodeling an extruder and providing polyvinyl alcohol with enough energy to rapidly melt the polyvinyl alcohol and substantially eliminate the crystallinity in the polyvinyl alcohol melt.

European Patent 0 187 040 discloses a method for producing films by introducing polyvinyl alcohol into polyethylene using silane or alkoxysilane as a compatibilizer to form an olefin/vinyl alcohol segment copolymer. However, when compared with the present invention, this method has several differences:

(1) a plasticizer, a processing aid and an antioxidant are not used in the modification of polyvinyl alcohol,
(2) only limited kinds of compatibilizer are used, and
(3) the barrier property against oxygen is significantly detericrated in spite of using the same amount of polyvinyl alcohol as the present invention.

This is because the patent only made possible the blending of polyolefin and polyvinyl alcohol using silane without improving the melting property of polyvinyl alcohol. Therefore, the obtained olefin/vinyl alcohol segment copolymer does not have the uiique morphology of the mixture consisting of polyolefin and polyvinyl alcohol as provided by the present invention, and thus the exhibition of the barrier properties of polyvinyl alcohol is limited.

European Patent 0 152 180 discloses a method for grafting polyvinyl alcohol by introducing a functional group into polyolefin. However, it chiefly deals with the properties of a compatibilizer and a grafting method based on such properties, and thus fails to overcome the occurrence of gel formation and yellowish phenomenon which are fundamental disadvantages in the event of melt processing of polyvinyl alcohol.

Polyvinyl alcohol is known as having the most excellent barrier properties against gases and organic solvents among existing polymers. However, the facts that melting point is close to the thermal decomposition temperature and that the gel forms easily in processing prevents directly using the excellent barrier properties of polyvinyl alcohol. Such gel is difficult to melt evenly and this results in difficulties with processing into articles especially at the processing into a film. Therefore, even if it is processed into a film, the film is of poor quality and low marketability. Also, polyvinyl alcohol is heat-sensitive and the thermal decomposition occurs very easily. Such a thermal decomposition phenomenon shows as the above-explained increase of gel and yellowish phenomenon. Especially, the yellowish phenomenon precedes rapidly as the processing temperature increases. As a result, dark yellowish phenomenon may occur at a conventional polyolefin processing temperature, which deteriorates the marketability.

To solve the above mentioned problems, U.S. Pat. No. 3,148,202 discloses the introduction of a plasticizer but it did not completely solve the thermal decomposition as well as the gel formation. As a plasticizer, polyhydric alcohol or polyethylene oxide was added and plasticization was carried out to melt polyvinyl alcohol. However, when the amount of plasticizer used is small, its effect is insignificant. When the amount is large, the tackiness of final products increases and thus deteriorates the marketability. Therefore, such a method does not contribute to the solution against gel formation in final products.

On the other hand, other process including the use of water as a plasticizer was also attempted. According to the process, water lowered the melting point of polyvinyl alcohol. The perfect crystal was dispersed evenly to form a gel-free melt state, which was then processed into a casting film. The resulting casing film was processed into a sheet without water by way of drying moisture or extruded into a tubular film for biaxial stretching. However, the process has problems in that (1) the thickness of the film is limited by the speed of removing water, (2) the crystal is re-formed due to a slow drying step, and (3) the water-removing step needs a large amount of energy which in turn greatly increases the cost for manufacturing the film. In addition, the above mentioned water-based technique cannot be used in the coextruded structure of the film because it is practically impossible to remove water from the coextruded film. The technique also cannot be used in blow molding, Therefore, the use of a water-based technique is restricted to a narrow range.

For these reasons, extruded articles such as films, sheets and containers which were produced by coextruding polyamides, polyvinylidene dichiondes (PVDC) and ethylene vinyl alcohol copolymers (EVOH) having barrier properties against gases and organic solvents as well as better processability than polyvinyl alcohol with polyolefin were used conventionally. Although polyamide has better processability than polyvinyl alcohol, the polyamide has a problem in that its barrier properties against gases and organic solvents are poor and it needs special processing technique because it has difficulty when being processed into biaxially stretched films. Using PVDC is also greatly restricted for the reason that when products comprising PVDC are burnt, noxious gases are produced and they cause environmental problems. EVOH having excellent barrier properties is very difficult to polymerize because the control range of ethylene and vinyl alcohol composition is very narrow. The homopolymer of vinyl alcohol produced as a by-product in a polymerization, in particular, may grow into gel or appear as burn spots during extrusion. Therefore, the process for removing the homopolymer is indispensable, which makes EVOH resin very expensive. It is also very difficult to process it into a film.

SUMMARY OF THE INVENTION

It is, therefore, an object of the present invention to provide compositions with improved melt processability due to other added components while showing excellent barrier properties of polyvinyl alcohol against gases and organic solvents in a final processed article. The realization of the purpose is supported by the fact that the shape of cross section of a resin pellet obtained by melt-extruding the composition has a unique morphology such as the cross section of an onion.

It is another object of the present invention to manufacture films, sheets and processed articles having excellent barrier properties against gases and organic solvents from the composition by using a conventional melt processing method.

It is a further object of the present invention to provide a multi layer article having excellent barrier properties against gases and organic solvents by the combination of the above films, sheets and processed articles with other resins.

As one aspect of the invention, a polyolefin/polyvinyl alcohol composition is provided and it comprises:

(A) 1 to 80% by weight of polyolefin and 20 to 99% by weight of polyvinyl alcohol, (B) based on 100% by weight of the polyolefin, 3 to 40% by weight of high molecular compatibilizer or 0.1 to 5% by weight of low molecular compatibilizer, and 0.01 to 0.5% by weight of initiator that causes the reaction between the compatibilizer and polyolefin, or the mixture of said high molecular compatibilizer, said low molecular compatibilizer and said initiator, (C) 3 to 50% by weight of plasticizer based on 100% by weight of the polyvinyl alcohol, (D) 1 to 10% by weight of processing aid based on 100% by weight of the polyvinyl alcohol, and (E) 0.01 to 5% by weight of antioxidant based on 100% by weight of polyvinyl alcohol.

It is a further object of the present invention to provide films, sheets and processed articles manufactured by melting said composition and multi layer products using the same.

The other objects and features of the present invention will become apparent to those skilled in the art from the following detailed description. It should be understood, however, that the detailed description and specific examples, while indicating preferred embodiments of the present invention are given by way of illustration and not limitation. Many changes and modifications within the scope of the present invention may be made without departing from the spirit thereof, and the invention includes all such modifications.

DETAILED DESCRIPTION

Polyolefin has an excellent processability and is inexpensive when compared to other general resins and polyvinyl alcohols, which render the final processing resins advantageous in terms of price competition. However, since polyolefin is poor in barrier properties against gases and organic solvents, it should be used in combination with resins in order to be used where barrier properties are required. The purpose of the present invention is to solve the above mentioned problems by choosing polyvinyl alcohol as a barrier material which can compensate the demerit of polyolefin while making use of its merits.

"The gases" that the terms are used herein refer to oxygen, nitrogen and organic solvents in a gas state; and "the organic solvents" that terms are also used herein refer to hydrocarbons such as benzene, toluene, xylene etc. and solvents of general organic compounds such as ketone, alcohol, ester, ether and the like. The following gases and organic solvents are also construed as above.

Examples of polyolefins usable in the present invention include one or at least two polymers or copolymers selected from the group consisting of polyethylene (HDPE, LDPE, LLDPE, MDPE, VLDPE), polypropylene, polybutene, ethylene-propylene rubber (EP rubber), etlylene-propylene-diene rubber (EPDM), poly-4-methyl-1-pentene (TPX), copolymer of propylene, butene, hexene and/or octene with ethylene, and olefin-based thermoplastic elastomer.

Polyvinyl alcohol is a polymer which has the most excellent barrier properties against gases and organic solvents among existing polymers. However, the fact that its melting point is close to the thermal decomposition temperature makes its application of a conventional heat-melt processing method impossible. However, in the present invention, a conventional heat-melt processing method can be applied due to the constitution of the above composition. A various kind of polyvinyl alcohol can be used for the present invention. Polyvinyl alcohol having the degree of hydrolysis of 99.5% by mol or less and the degree of polymerization of 300 to 3000 is preferred. Polyvinyl alcohol having the degree of hydrolysis of 85 to 90% by mol and a degree of polymerization of 400 to 2000 is more preferred.

A plasticizer lowers the melting point of polyvinyl alcohol to make heat melting possible and drops the degree of crystallinity of polyvinyl alcohol to decrease rigidity and brittleness and, furthermore, solves the problem of gel formation. Examples of plasticizers usable in the present invention include either one or a mixture of at least two compounds selected from the group consisting of glycerin, ethylene glycol, diethylene glycol, propylene glycol, dipropylene glycol, a mixture of glycerin and water, polyethylene glycol, polypropylene glycol, trimethylol propane, triethylene glycol and isopropanol. Especially, glycerin having a 99% or greater purity or a mixture of glycerin and water, and trimethylol propane is preferred. When the content of the plasticizer is more than 30% by weight, the processability of polyvinyl alcohol increases but the barrier properties decrease. When the content of the plasticizer is less than 5% by weight, the barrier properties increase greatly, but the processability diminishes significantly. Therefore, the content of 5 to 30% by weight of the plasticizer is preferred.

The thermal decomposition of polyvinyl alcohol starts gradually at 100° C. and the speed of the thermal decomposition grows larger at 150° C. or higher. When the temperature exceeds 200° C., thermal decomposition proceeds rapidly. This can be confirmed by the color change to yellow. Therefore, processing aids and antioxidants that keep polyvinyl alcohol from yellowish phenomenon are needed. Examples of processing aids usable in the present invention include either one or a mixture of at least two compounds selected from the group consisting of acrylic oligomers, phosphates, calcium stearate, zinc stearate, magnesium stearate, stearic acid, paraffin wax and polyethylene wax, The amount added is preferably 2 to 7% by weight based on 100% by weight of polyvinyl alcohol.

Antioxidants prevent the yellowish phenomenon and simultaneously stabilize polyvinyl alcohol against heat at a time of processing and/or at the long term use. Examples of antioxidants usable in the present invention include either one or a mixture of two or more compounds selected from the group consisting of sterically hindered phenol-based antioxidants, phosphate-based antioxidants, calcium/zinc/tin-based organic mixture antioxidants, dioctyltin maleate-based antioxidants and dioctyltin mercaptide-based antioxidants. The amount added is preferably 0.05 to 3% by weight based on 100% by weight of polyvinyl alcohol.

Polyolefin is essentially immiscible with polyvinyl alcohol. Thus, when forming a resin by mixing polyolefin and polyvinyl alcohol, a separated interface is formed between two phases, which deteriorates the barrier properties and mechanical properties of the processed articles. For these reasons, it is required to use high molecular compatibilizers that simultaneously have both non-polar segments having compatibility with polyolefin and polar segments having compatibility with polyvinyl alcohol in one molecular unit, or low molecular compatibilizers that are bonded to a part of molecular chains of polyolefin through chemical reactions and thus modify the compatibility of polyolefin, and initiators that induce the above reaction. If necessary, high molecular compatibilizers, low molecular compatibilizers and initiators can be used together.

As the high molecular compatibilizers, either one or a mixture of at least two selected from the group consisting of ethylene-acrylic acid copolymer (EAA), ethylene-methacrylic acid copolymer (EMA), ethylene-ethylacrylate copolymer (EEA), ethylene-alkylacrylate-acrylic acid copolymer, ethylene-alkylmethacrylate-methacrylic acid copolymer, ethylene-butylacrylate copolymer (EBA) and ethylene-vinylacetate copolymer (EVA), or modified compounds thereof can be used. Especially, ethylene-ethylacrylate copolymers modified with maleic anhydride are preferred among them. The amount added is preferably 5 to 20% by weight based on 100% by weight of polyolefin.

As the low molecular compatibilizers, monomers that have carboxyl groups in molecular units or unsaturated silane compounds are used. For example, either one or a mixture of at least two selected from the group consisting of acrylic acid, methacrylic acid, maleic acid, fumaric acid, itaconic acid, crotonic acid, sorbic acid and anhydrides thereof, and vinyltrimethoxy silane, vinyltrimethoxyethoxy silane, vinyltriethoxy silane, $\gamma$-(meth)acryloxypropyltrimethoxy silane, $\gamma$-(meth)acryloxypropyltriethoxy silane, vinyl-tris($\beta$-methoxyethoxy)silane and vinyltriacetoxy silane is used. The amount of a low molecular compatibilizer to be added is preferably 0.5 to 3% by weight based on 100% by weight of polyolefin.

As the initiators, either one or a mixture of two or more compounds selected from the group consisting of acyl peroxide, di-alkyl or di-aryl peroxide, peroxy ester, hydro peroxide, ketone peroxide and azo compound initiator can be used. For example, either one or a mixture of two or more compounds selected from the group consisting of benzoyl peroxide, di-t-butyl peroxide, dicumyl peroxide, cumylbutyl perioxide, 1,1-di-t-buytlperoxy-3,5,5-trimethylcyclohexane, 2,5-dimenthyl-2,5-2,5-di-t-butyl peroxy isopropylbenzene, t-butyl peroxy pivalate, t-butyl di(perphthalate)dialkyl peroxymonocarbonate, peroxydicarbonate, t-butyl hydroperoxide, p-methane hydroperoxide, cumene hydroxide, cyclohexano peroxide, methylethylketone peroxide and azobisisobutylonitrile can be used. The amount of an initiator to be added is preferably 0.05 to 0.3% by weight based on 100% by weight of polyolefin.

The above polyolefin/polyvinyl alcohol composition forms a unique morphology similar to the cross sectional view of onions, which is one of the characteristics of the present invention.

The polyolefin/polyvinyl alcohol composition can be classified into two types depending on the changes of the morphology. One type is where the content of polyvinyl alcohol is less than 50% by weight, and the other type is where the content of polyvinyl alcohol is more than 50% by weight. When the content of polyvinyl alcohol is less than 50% by weight, polyolefin forms matrix phases. When the content of polyvinyl alcohol is more than 50% by weight, polyvinyl alcohol forms matrix phases.

Figure 1:
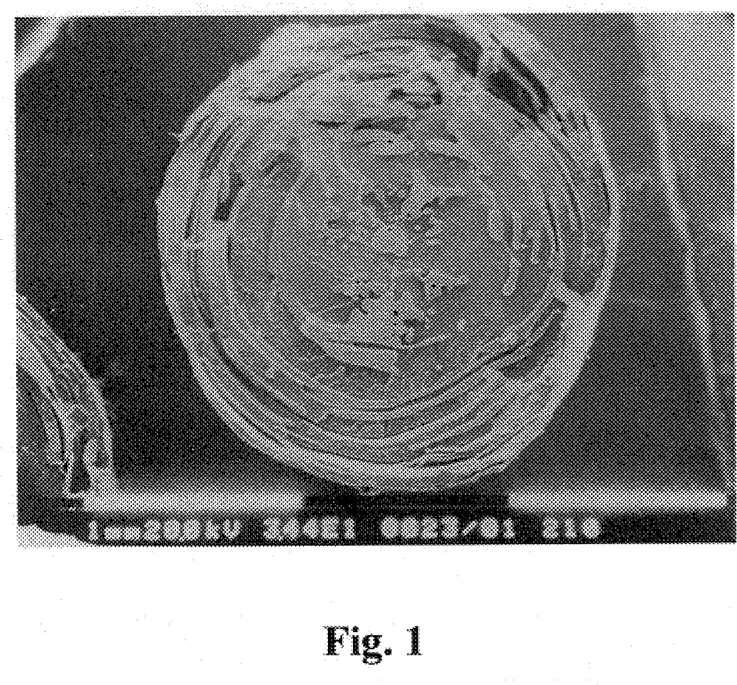
FIG. 1 shows an electron microscopic photograph of the cross section of a pellet (X34).
Figure 2:
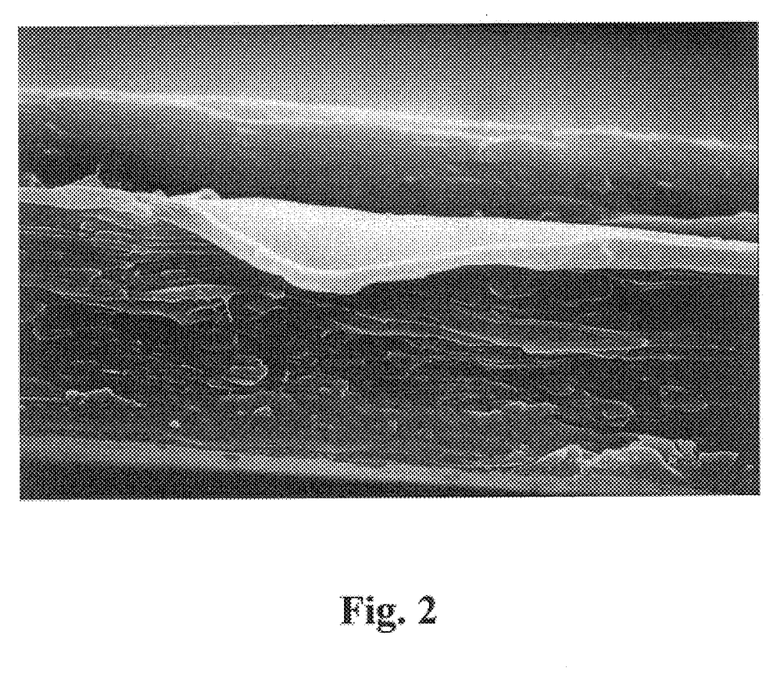
FIG. 2 shows an electron microscopic photograph of the cross section of a film (X1500).

When polyolefin forms matrix phases, that is, the content of polyvinyl alcohol is less than 50% by weight, polyvinyl alcohol is coated with polyolefin, which diminishes water solubility of polyvinyl alcohol. This configuration can be confirmed in FIGS. 1 and 2 which show scanning electron microscopic photographs of the cross section of pellets and films prepared by extruding the composition of polyolefin/polyvinyl alcohol. Referring to FIG. 1 showing the cross section of pellets, it is confirmed that polyolefin (polyethylene) forms round matrixes, in which polyvinyl alcohol forms a series of straps such as circular arcs in many folds (like onions). Referring to FIG. 2 showing the cross section of films, it is confirmed that the outer polyolefin wraps the inner polyvinyl alcohol up and down. FIG. 2 shows that there is a white protrusion in the middle of a film. The protrusion is polyvinyl alcohol resin separated in the cutting process of the film, which confirms that there are a series of thinner and longer plates of polyvinyl alcohol in the matrixes of polyolefin.

In particular, the morphology of the series of straps such as circular arcs is a very unique structure that does not appear in conventional pellet preparation. The structure of the series of straps such as circular arcs shown in the pellets can maximize the barrier properties of the resin in the extruding process into films, sheets and containers, and it can significantly enhance the barrier effect in the form of thin films.

Particularly, prior methods for preparing films have not been able to utilize conventional processing apparatus, and extruding articles can be carried out through special remodeling of machines. However, when the pellets made of the composition according to the present invention are used, even if the melting process is carried out by using conventional machines, the pellets show an excellent morphology in the form of consecutive plates without the remodeling of parts such as screws. Therefore, the resultant films show excellent barrier properties.

As mentioned above, the composition resin of the present invention shows a unique morphology that is not confirmed in the prior polyvinyl alcohol composition resins. Such morphology is caused by a structure that maximizes the barrier properties of polyvinyl alcohol against gases and organic solvents and at the same time exhibits the water resistance of polyolefin. Also, polyolefin that constitutes the outer surface of processed articles can be heat melted and adhered to other polyolefin articles without requiring an adhesive, and articles are stable in air moisture. Thus, the barrier properties of polyvinyl alcohol are not affected by moisture. Therefore, pellets of polyolefin/polyvinyl alcohol composition can be extruded using a twin extruder and then are directly extruded alone or co-extruded with other polyolefins to form films, sheets and containers without the drying process over a long period of time as required in conventional barrier resins such as polyamide or EVOH.

Meanwhile, in case that polyvinyl alcohol forms matrix phases, that is, where the content of polyvinyl alcohol is more than 50% by weight, then polyvinyl alcohol which is sensitive to moisture appears on the outer surface of processed articles, which resultantly renders it difficult to be used as a single film. Instead, it may be co-extruded or laminated with other water-resistant polyolefin resins using adhesives as generally adopted in the manufacturing of multi layer articles for packaging. The final articles co-extruded or laminated with polyolefin have excellent barrier properties and can be prepared just by conventional processing methods which are the same as methods for preparing other barrier multi layer articles such as polyamide, EVOH, etc. Such barrier multi layer articles are the same as other multi layer articles in that they use adhesives; however, the barrier multi layer articles have some advantages in that the polyolefin/polyvinyl alcohol composition is much better in barrer properties and is cheaper than polyamide, and it has the same level of barrier properties as EVOH while it costs approximately only a third of the price of EVOH.

The following is an example of processing a composition of the present invention into pellets before processing into films, sheets or other articles:

First, a plasticizer, a processing aid and an antioxidant are added to the polyvinyl alcohol and mixed in a super mixer or a Hansel mixer at more than 100 rpm for 5 minutes or more. The mixed polyvinyl alcohol composition is dried in a dehumidifying drier at 80 to 120° C. for more than 3 hours. In the meantime, a high molecular compatibilizer, a low molecular compatbilizer and an initiator are added to the polyolefin and mixed in a super mixer or a Hansel mixer at more than 100 rpm for 5 minutes or more. The polyvinyl alcohol composition and the polyolefin composition separately mixed are then mixed together in a super mixer or a Hansel mixer, and then extruded in a twin extruder and cut into a pellet type.

The films of the present invention can be obtained by processing the composition into pellets as above and then melt-processing the pellets. In case that the composition is firstly processed into pellets for the convenience of storage and transporting and, if desired, is then subjected to melt processing to form films, it is preferable to carry out a drying process that removes moisture which may be introduced in the course of storage or transporting. The drying process is preferably carried out in a dehumidifying drier at 80 to 100° C. for more than 3 hours.

The films of the present invention can be prepared by general melting method for preparing films such as ring-die melt processing method (or blowing film preparing method) and T-die melt processing method (or casting film preparing method). The prepared films can be used in both a stretched or unstretched state.

The content of vinyl alcohol unit in the polyvinyl alcohol resin is an important variable in barrier properties against oxygen and organic solvents. That is, only when the content of the vinyl alcohol unit (the degree of hydrolysis) is more than 60% by mol, the crystal structure exists as a monoclinic crystal structure, so that it has a barrier effect. Polyvinyl alcohol is a crystalline polymer having a monoclinic crystal structure because it generally has more than 85% by mol of the degree of hydrolysis. However, the crystallinity varies depending on the degree of hydrolysis. For example, when the degree of hydrolysis of polyvinyl alcohol is 87 to 89% by mol, the crystallinity is 12 to 18%. When the degree of hydrolysis is 98 to 99% by mol, the crystallinity is 30 to 40%. Therefore, the barrier properties of polyvinyl alcohol are excellent when polyvinyl alcohol has 98 to 99% by mol of the degree of hydrolysis. Polymers generally have low crystallinity unlike metals. Most polymers have crystal parts and amorphous parts in a mixed form. Polymers in a melting state become amorphous (non-crystal part) due to free thermal motion. If the temperature is lowered, polymers form a secondary crystal structure due to the slow-down of molecular movement. At this time the crystallinity varies depending on the processing condition. Therefore, in order to improve barrier properties, it is important to raise the degree of hydrolysis and the content of polyvinyl alcohol, but it is a more important factor to increase the crystallinity when the same kind and same amount of polyvinyl alcohol is used. Since the stretching of films plays an important role in enhancing the crystallinity, the higher the elongation ratio is, the greater the crystallinity becomes. Preferably, the composition of polyolefin and polyvinyl alcohol is subjected to a T-die melt processing method to form casting films and is then biaxially stretched successively or at the same time, preferably stretched to a size more than 3×3.

In the case where polyolefin forms a matrix, it is possible to keep moisture permeability at the level of polyolefin, which in turn makes it possible to heat melt adhesion to polyolefin with barrier properties of films not being influenced by moisture. Therefore, if only barrier properties of films meet commercial requirements, it is possible both to obtain products which have excellent physical properties and to lower manufacturing costs significantly. For example, in the case of a multi layer film consisting of polyethylene on both sides, five layers of [polyethylene layer/adhesive layer/barrier layer/adhesive layer/polyethylene layer] are required in the prior art. However, according to the present invention, only three layers of [polyethylene layer/barrier layer/polyethylene layer] are required by omitting two adhesive layers. As a result, the number of processing steps is not only reduced but the manufacturing cost may also be reduced due to the absence of expensive adhesives. The barrier layer of the prior art is polyamide and EVOH, while the barrier layer of the present invention refers to the melt film layer of the polyolefin/polyvinyl alcohol composition. Especially, in the case where polypropylene is used instead of polyethylene in the above example, it is possible to maximize the elongation ratio which is important for increasing crystallinity by adopting a T-die melt processing method instead of a ring-die melt processing method. Therefore, if biaxial stretching is carried out, the barrier effect may be maximized.

Therefore, it is preferred that a plasticizer, a processing aid, a compatibilizer and an initiator are added to the mixture of 40 to 50% by weight of polyvinyl alcohol and 60 to 50% by weight of polypropylene and then mixed. The resulting mixture is extruded by a twin extruder to form pellets which are subjected to a T-die melt processing in a single extruder to give casting films, The casting films are biaxially stretched at 140 to 160° C. which is the softening point of films. At this time, the greater the ratio of elongation is, the better the physical properties such as transparency, mechanical properties and barrier properties become. Films obtained show excellent barrier properties superior to biaxially stretched polyamide films (the prior barrier films) and can reach the same level as those of EVOH depending on the processing conditions and the composition ratio. The increase of crystallinity depending on the elongation ratio and the improvement of barrier properties and general physical properties accompanied by the increase of crystallinity are applied to the blown films obtained by a ring-die melt processing method. In particular, when films are heat-treated at 80 to 140° C. for several minutes to several tens of minutes after film extruding, these films showing good barrier properties against gases and organic solvents even under conditions of high humidity over a long period are obtained.

In the case where polyvinyl alcohol forms matrixes (the content of polyvinyl alcohol is more than 50% by weight), polyvinyl alcohol exists on the outer surface of the film layer of the polyolefin/polyvinyl alcohol composition. Since water absorption rate of polyvinyl alcohol is very high up to 20% by weight, polyvinyl alcohol is sensitive to water. When polyvinyl alcohol contacts directly with moisture in air, its barrier properties against gases and organic solvents decrease abruptly. Therefore, multi layer films having water-resistant polyolefin on both sides of the barrier layer are preferred. To bond polyvinyl alcohol in the barrier layer with polyolefin in the water-resistant film layer, it is preferable to manufacture multi layer films by a coextruding method using adhesive materials, or introducing carboxylic acid groups or silanes into polyolefin in the water-resistant film layer, or using high molecular compatibilizers between both sides. These multi layer films have almost the same barrier properties against gases and organic solvents as EVOH and exhibit a very low processing cost. Meanwhile, the barrier properties of films prepared by co-extrusion are proportional to the elongation ratio of films. The less the content of polyvinyl alcohol is, the more apparent the proportional relation is. When the content of polyvinyl alcohol exceeds 60 to 70% by weight, there is no great difference in barrier performances according to elongation ratio, but general physical properties still increase in proportion to the elongation ratio. Accordingly, the preferred elongation ratio is more than 3×3. These properties are also applied to both a ring-die melt processing method and a T-die melt processing method.

The present invention also relates to a multi layer film which comprises a melt film (barrier layer) of the polyolefin/polyvinyl alcohol composition and other polymer films adhered to either one side or both sides of the melt film.

The materials bonded to either one side or both sides of the barrier layer are polyolefin, modified polymer or copolymer of polyolefin, or blending resin of polyolefin and other resin. The purpose of introducing other polymers into either one side or both sides of the barrier layer is to bond cheap polymers which allow new functions and which increase the competitive power of price in terms of equivalent volume or weight.

As previously explained, in such a case where the polyolefin forms matrixes, multi layer films may be obtained by co-extrusion without adhesives which were essential in the prior art or by lamination. In a case where polyvinyl alcohol forms matrixes as explained above, it is preferable to carry out a three-layer or five-layer co-extrusion from the outset of preparing the barrier film. If necessary, it is possible to add a lamination process. These processed articles can be generally used for foods, medicines and industrial purposes.

Multi layer films may, if desired, have a paperboard layer separately applied. The paperboard layer is positioned between the barrier layer and other film layer and, if necessary, a separate adhesive layer may be applied therein. For example, a barrier layer of polyolefin/polyvinyl alcohol and a polyolefin layer are co-extruded to form two-layered barrier films on which an adhesive is pasted. To this, a paperboard layer is adhered using a dry lamination method. Finally, polyethylene is melted and coated on the paperboard layer. In this case, the multi layer film is composed of 5-layers [polyolefin layer/barrier layer/adhesive layer/paperboard layer/polyethylene layer], which have one less layer when compared to prior multi layer film [polyolefin layer/adhesive layer/barrier layer/adhesive layer/paperboard layer/polyethylene layer] for use as paper containers. Accordingly, the former has an advantage in that its processing steps can be shortened. These articles may be used as barrier paper containers for milk, juices or alcoholic liquors.

The present invention also relates to articles in the form of sheets or containers obtained by subjecting the composition of polyolefin/polyvinyl alcohol to melt extruding. These articles may be single melt articles of polyolefin/polyvinyl alcohol composition or multi layer sheets or containers wherein resins consisting of other components or polymers may be positioned continuously on one side, both sides or multi-sides of them, as mentioned with regard to multi layer films. In the case of sheets, after they are manufactured by a three-layer or five-layer co-extrusion method, they are then processed into containers or trays by thermoforming.

In such a case where an article is prepared by thermoforming as above, polypropylene is especially preferable as a polyolefin of the barrier layer and as a polymer to be introduced on both sides. Alternatively, polystyrene having excellent thermoforming properties may be used on both sides of the barrier layer. When the article is used for foods, a barrier layer having more than 50% by weight of polyvinyl alcohol is preferred and especially a barrier layer having 60 to 70% by weight of polyvinyl alcohol is preferred. It is preferable to adopt a five-layer co-extrusion method.

Bottles may be prepared using a blow extruding method. When the bottles are used for industrial purposes (bottles for agricultural chemicals, paints, fuels, organic solvents, etc.), barrier layers having 30 to 50% by weight of polyvinyl alcohol are preferred and especially barrier layers having 40 to 50% by weight of polyvinyl alcohol are more preferred. The extrusion of the barrier layers may be carried out more preferably by a two-layer co-extrusion method than by a single extrusion, a three-layer co-extrusion or four-layer co-extrusion method. When a barrier layer and HDPE are two-layer co-extruded, this may lower production costs by omitting an adhesive layer when compared to three-layer co-extrusion of an existing HDPE/adhesive layer/barrier layer (polyamide or EVOH). Furthermore, the price of a two-layer co-extruder is much lower than that of a three-layer co-extruder and thus the initial investment cost lowers. Productivity may also increase due to a constitution which has one less layer. In such a case as bottles for foods and medicines, it is more preferred that a barrier layer has more than 50% by weight of polyvinyl alcohol. It is preferred that a barrier layer has 60 to 70% by weight of polyvinyl alcohol and a five-layer co-extrusion is preferable.

If polyolefin to be used both in a barrier layer and in a coating layer is polypropylene, films, sheets or containers for packaging which can be used in boiling water or in a microwave oven may be manufactured therefrom.

EXAMPLE

The present invention is described in more detail by referring to the following examples without limiting the scope of the invention in any way.

Example 1

In a Super Mixer, 30% by weight of polyvinyl alcohol having different degrees of hydrolysis and polymerization as shown in Table 1 was mixed with 20% by weight of glycerin, 2% by weight of phosphate-based processing aid (liqud, viscosity=700 cps) and 0.05% by weight of phosphate-based antioxidant (white powder, melting point=237° C., molecular weight=663) based on 100% by weight of polyl alcohol. 1% by weight of maleic anhydride (a low molecular compatibilizer) and 0.1% by weight of dicumyl peroxide (an initiator) based on 100% by weight of low density polyethylene (LDPE) were coated on 70% by weight of LDPE [melt index (MI)=1, density ($\rho$)=0.918], which were dry-blended with the above mixture of polyvinyl alcohol/plasticizer/processing aid/antioxidant in a Super Mixer. The mixture was then dried for 12 hours in a drier at 80° C. and extruded in a twin extruder into pellets at screw speed 40 rpm in a twin extruder ($\phi$40, L/D=35). The temperature gradient in the extruder was 170° C.–190° C.–200° C.–210° C.–220° C.–200° C. The pellets were processed into blown films (600 mm of width×45 $\mu$m of thickness) in a single extruder. The temperature of the extruder was maintained at 220 to 230° C. and the compression ratio of the screw used was 3:1. The melting point, melt index, yellow index, haze (measurement of transparency) and gas permeability of the obtained films were measured and the results are shown in Table 1. The less the yellow index, haze and gas permeability are, the better the physical properties of the films are.

TABLE 1

| Number of experiments | PVA | | Melt index | Yellow index | Haze | Gas permeability |
| --- | --- | --- | --- | --- | --- | --- |
| | Degree of hydrolysis | Degree of polymerization | | | | |
| #1 | 99 | 2000 | 1 | 5.2 | 92 | 154 |
| #2 | 99 | 1000 | 5 | 3.1 | 71 | 126 |
| #3 | 99 | 1700 | 2 | 3.5 | 80 | 133 |
| #4 | 88 | 1700 | 2 | 2.6 | 57 | 145 |
| #5 | 88 | 600 | 10 | 2.4 | 58 | 97 |

* Degree of hydrolysis: % by mol
* Melt index: unit (g/10 min, 230° C.)
* Gas permeability: unit (cc/m$^2$, atm, 24 hours, 20° C., 65% RH)
* phr: part per hundred raw material Example 2

Polyvinyl alcohol (V1) (degree of hydrolysis: 99% by mol and degree of polymerization: 1,700), polyvinyl alcohol (V2) (degree of hydrolysis 88% by mol and degree of polymerization: 1,700) and polyvinyl alcohol (V3) (degree of hydrolysis: 88% by mol and degree of polymerization: 600) were dry-blended with varying ratios as shown in Table 2. The mixtures were processed into blown films by the same method as described in Example 1. The melt index, yellow index, haze and gas permeability of the films were measured. The results are summarized in Table 2.

TABLE 2

| Number of experiments | Blending ratio | | | Melt index | Yellow index | Haze | Gas permeability |
| --- | --- | --- | --- | --- | --- | --- | --- |
| | V1 | V2 | V3 | | | | |
| #6 | 70 | — | 30 | 2 | 3.9 | 70 | 149 |
| #7 | 50 | — | 50 | 4 | 3.4 | 67 | 112 |
| #8 | 30 | — | 70 | 7 | 3.0 | 63 | 106 |
| #9 | — | 50 | 50 | 5 | 2.9 | 59 | 118 |

* Blending ratio: unit (weight ratio)

Example 3

30% by weight of polyvinyl alcohol mixture consisting of polyvinyl alcohol (degree of hydrolysis: 99% by mol and degree of polymerization: 1,700) and polyvinyl alcohol (degree of hydrolysis: 88% by mol and degree of polymerization: 600) at a 50:50 weight ratio was dry-blended with 70% by weight of LDPE having different molecular weight in the same manner as in Example 1. The resulting mixture was processed into casting films using a plasti-coder single extruder (manufactured by Bravender Co.) while maintaining the temperature at 230° C. At this time, the gap of T-die was fixed at 1 mm, the speed of the screw at 10 rpm and the speed of take-off at 0.8 m/min. The change of LDPE in molecular weight is indicated by the melt index (MI). The results are summarized in Table 3.

TABLE 3

| Number of experiments | LDPE (MI) | Melt index | Yellow index | Haze | Gas permeability |
|---|---|---|---|---|---|
| #10 | 1.6 | 7 | 5.3 | 87 | 92 |
| #11 | 2 | 9 | 4.2 | 89 | 91 |
| #12 | 3 | 10 | 3.5 | 92 | 89 |

* Melt index of LDPE: unit (g/10 min., 190° C.)

Example 4

The mixture consisting of polyvinyl alcohol (degree of hydrolysis: 99% by mol and degree of polymerization: 1,700) and polyvinyl alcohol (degree of hydrolysis: 88% by mol and degree of polymerization: 600) at a 50:50 weight ratio was mixed with LDPE (MI=1, ρ=0.918) with different mixing ratios. The resulting mixture was processed into casting films in the same manner as in Example 3. The yellow index, haze and gas permeability of the films were measured and the results are summarized in Table 4.

TABLE 4

| Number of experiments | LDPE (% by weight) | PVA (% by weight) | Melt index | Yellow index | Haze | Gas permeability |
|---|---|---|---|---|---|---|
| #13 | 50 | 50 | 10 | 4.3 | 92 | 85 |
| #14 | 30 | 70 | 15 | 5.2 | 97 | 95 |

Example 5

To the mixture of 30% by weight of polyvinyl alcohol (degree of hydrolysis: 88% by mol and degree of polymerization: 600) and 70% by weight of LDPE, 20 phr of plasticizer, 2 phr of processing aid and 0.05 phr of antioxidant were added in the same manner as in Example 1 except that the kind of plasticizer was changed. The resulting mixture was processed into pellets and casting films in the same manner as in Example 3. The yellow index, haze and gas permeability of the films were measured and the results are summarized in Table 5.

TABLE 5

| Number of experiments | Plasticizer (phr) | Melt index | Yellow index | Haze | Gas permeability |
|---|---|---|---|---|---|
| #15 | Glycerol/water (85/15) | 8 | 2.8 | 64 | 77 |
| #16 | Triethylene Glycol | 9 | 3.2 | 75 | 81 |
| #17 | Trimethylol Propane | 9 | 3.1 | 73 | 79 |

Example 6

To the mixture of 30% by weight of polyvinyl alcohol (degree of hydrolysis: 88% by mol and degree of polymerization: 600) and 70% by weight of LDPE, glycerol as a plasticizer was added in a different amount. The resulting mixtures were processed into casting films in the same manner as in Example 5. The yellow index, haze and gas permeability of the films were measured. The results are summarized in Table 6.

TABLE 6

| Number of experiments | The amount of glycerol added | Melting point (° C.) | Melt index | Yellow index | Haze | Gas permeability |
|---|---|---|---|---|---|---|
| #18 | 30 | 156 | 12 | 1.8 | 51 | 122 |
| #19 | 10 | 173 | 4 | 5.1 | 84 | 63 |

* The amount of glycerol added: unit (phr)

Example 7

To the mixture of 30% by weight of polyvinyl alcohol (degree of hydrolysis: 88% by mol and degree of polymerization: 1,700) and 70% by weight of LDPE, a processing aid and an antioxidant were added with their kind and amount varying. The resulting mixtures were processed into blown films in the same manner as in Example 1. Since the processing aid and antioxidant do not influence the gas permeability, only the yellow index and haze were measured and the results are summarized in Table 7.

TABLE 7

| Number of experiments | Processing aid Kind | Added amount | Antioxidant Kind | Added amount | Yellow index | Haze |
|---|---|---|---|---|---|---|
| #20 | FC-113 | 2 | PEP-24G | 0.05 | 1.8 | 42 |
| #21 | FC-113 | 2 | P | 0.05 | 2.3 | 49 |
| #22 | AX-38 | 2 | PEP-24G | 0.05 | 2.1 | 53 |
| #23 | FC-113 | 4 | P | 0.1 | 2.0 | 45 |
| #24 | MG-ST | 4 | PEP-36 | 0.1 | 2.5 | 59 |

* FC-113: Acrylic oligomer-based processing aid (Hannong Adeka), white powder, softening point (110° C.)
* MG-ST: Magnesium stearate (Hannong Adeka), white powder, melting point (130° C.)
* PEP-24G: (Hannong Adeka), white particle, melting point (165° C.), molecular weight (604)
* P: (Hannong Adeka), liquid, viscosity (2500 cps)

Example 8

To the mixture of 30% by weight of polyvinyl alcohol (degree of hydrolysis: 88% by mol and degree of polymerization: 600) and 70% by weight of LDPE, a compatibilizer was added with its kind and amount varying. The resulting mixtures were processed into blown films in the same manner as in Example 1. The yellow index, haze and gas permeability were measured and the results are summarized in Table 8.

TABLE 8

| Number of experiments | Compatibilizer Kind | Added amount | Melt index | Yellow index | Haze | Gas permeability |
|---|---|---|---|---|---|---|
| #25 | EVA | 20 | 7 | 5.4 | 95 | 540 |
| #26 | A-1600 | 20 | 14 | 2.5 | 62 | 91 |
| #27 | A-1600 | 10 | 16 | 3.1 | 69 | 105 |
| #28 | A-1600 | 5 | 17 | 3.4 | 72 | 130 |
| #29 | VTMO + DCP | (1) + (0.05) | 10 | 2.3 | 57 | 83 |
| #30 | A-1600 + DCP | (10) + (0.05) | 15 | 2.9 | 63 | 77 |
| #31 | A-1600 + DCP | (5) + (0.05) | 17 | 3.2 | 67 | 85 |

* A-1600: ethylene-ethylacrylate copolymer modified with maleic anhydride (Nippon Oil Co.)
* VTMO: Vinyltrimethoxy-silane
* DCP: Dicumyl peroxide

Example 9

By using the mixture consisting of 50% by weight of polyvinyl alcohol (degree of hydrolysis: 88% by mol and degree of polymerization: 1,700) and 50% by weight of polyvinyl alcohol (degree of hydrolysis: 88% by mol and degree of polymerization: 600), casting films were prepared in the same manner as in Example 3 except that the extrusion temperature was changed. The yellow index, haze and gas permeability of the casting films were measured and the results are summarized in Table 9.

TABLE 9

| Number of experiments | Thickness of Film | Melt index | Temperature of extruder | Yellow index | Haze | Gas permeability |
|---|---|---|---|---|---|---|
| #32 | 135 | 2 | 210 | 2.9 | 94 | 96 |
| #33 | 130 | 4 | 190 | 2.5 | 91 | 174 |

* Thickness of film: unit ($\mu$m)
* Temperature of extruder: unit (° C.)

Example 10

The polyvinyl alcohol having degree of hydrolysis of 88% by mol and degree of polymerization of 600 and LDPE were mixed at the same mixing ratio as in Example 1. The resulting mixture was melt extruded in a twin extruder, both sides of which were coated with LDPE (MI=3, $\rho$=0.918) in a three-layer co-extruder to form three-layer casting films. The condition of the three-layer extruder was the same as in Example 3. The yellow index, haze and gas permeability of the casting films were measured and the results are summarized in Table 10.

TABLE 10

| Number of experiments | Content (% by weight) PVA | Content (% by weight) LDPE | Thickness of film ($\mu$m) | Yellow index | Haze | Gas permeability |
|---|---|---|---|---|---|---|
| #34 | 30 | 70 | 141 | 1.5 | 26.4 | 74 |
| #35 | 40 | 60 | 143 | 1.9 | 28.6 | 55 |

Example 11

The same procedure as in Example 10 was repeated using 70% by weight of polyvinyl alcohol and 30% by weight of LDPE (M=1, $\rho$=0.918). This example was different from Example 10 in that the LDPE (MI=3, $\rho$=0.918) was previously coated with 1 phr of a low molecular compatibilizer ahydrous maleic acid and 0.1 phr of an initiator dicumyl peroxide, which reacted in a twin extruder to render a carboxylic acid functional group introduced into LDPE. Thus the obtained LDPE was three-layer co-extruded with LDPE/polyvinyl alcohol layer so that it could be adhered without using adhesives.

TABLE 11

| Number of experiments | Thickness of film ($\mu$m) | Yellow index | Haze | Gas permeability |
|---|---|---|---|---|
| #36 | 154 | 2.1 | 43 | 15 |

Example 12

The same procedure as in Examples 10 and 11 were repeated except that three-layer extruded blown films were manufactured. The extrusion condition of the three-layer extruding blower was the same as in Example 1. The physical properties of the blown films are summarized in Table 12.

TABLE 12

| Number of experiments | Content (% by weight) PVA | Content (% by weight) LDPE | Thickness of film ($\mu$m) | Yellow index | Haze | Gas permeability |
|---|---|---|---|---|---|---|
| #37 | 30 | 70 | 43 | 1.3 | 14.1 | 44 |
| #38 | 40 | 60 | 49 | 1.6 | 15.1 | 29 |
| #39 | 70 | 30 | 57 | 1.9 | 22 | 9 |

Example 13

Casting films were manufactured by repeating Examples 10 and 11, except that LDPE (MI=1, $\rho$=0.918) constituting the composition of the barrier layer and LDPE resin (MI=3, $\rho$=0.918) constituting the coating layer were replaced with PP (MI=2, polypropylene) and PP resin (MI=4, polypropylene). In the experiment #42, VTMO was introduced into PP (MI=4, polypropylene) of the coating layer to facilitate bonding with the PP/polyvinyl alcohol layer, and then a three-layer extrusion was carried out.

TABLE 13

| Number of experiments | Content (% by weight) PVA | Content (% by weight) PP | Thickness of film ($\mu$m) | Yellow index | Haze | Gas permeability |
|---|---|---|---|---|---|---|
| #40 | 30 | 70 | 208 | 1.8 | 27.5 | 75 |
| #41 | 40 | 60 | 209 | 1.9 | 28.9 | 52 |
| #42 | 70 | 30 | 213 | 2.1 | 41 | 16 |

Example 14

The casting films, obtained in Example 13, consisting of 40% by weight of polyvinyl alcohol and 60% by weight of PP were laminated in a thickness of 1 mm by a press, and then biaxially stretched at 150° C. The gas permeability was measured and the results are summarized in Table 14.

TABLE 14

| Number of experiments | Elongation ratio (MD x TD) | Thickness of film ($\mu$m) | Yellow index | Haze | Gas permeability |
|---|---|---|---|---|---|
| #43 | 5 x 5 | 32–25 | 0.8 | 3.3 | 3.5–9.5 |
| #44 | 5 x 9 | 24–18 | 0.7 | 3.1 | 1.4–8.0 |
| #45 | 7 x 9 | 21–15 | 0.5 | 2.5 | 0.5–5.0 |

Example 15

40% by weight of polyvinyl alcohol (degree of hydrolysis: 88% by mol and degree of polymerization: 600) and 60% by weight of HDPE (MI=0.3, $\rho$=0.958) which was mixed with the same amount and kind of a plasticizer, a processing aid and an antioxidant as in Example 1 and coated with A-1600 (10 phr) and DCP (0.05 phr) were dried in a drier at 80° C. for 12 hours and extruded in a twin extuder to give pellets. The pellets were molded into a 500 ml bottle by using a two-layer blowing molding extruder ($\phi$60, $\rho$35) wherein HDPE (MI=0.3, $\rho$=0.958) was introduced into a $\phi$60 extruder and HDPE/polyvinyl alcohol was introduced into a φ35 extruder, respectively. The thickness of the bottle was 0.8 mm wherein HDPE outer layer was 0.72 mm thick and the barrier layer of inner HDPE/polyvinyl alcohol was 0.08 mm thick. The bottle was charged with toluene and the inlet was sealed with aluminum. After the bottle was subjected to three cycles of being left in an oven at 50° C. for 2 weeks and then left in a low temperature chamber at −10° C. for one week, a weight loss from the initial weight was measured to calculate a loss percent (%). The percent of weight loss thus calculated was 0.3%, and there was no change in the contour of the bottle.

EFFECTS OF THE INVENTION

As explained above, the composition of polyolefin/polyvinyl alcohol of the present invention simultaneously shows: processability, low price and water resistance which are advantages of polyolefin; and barrier properties against gases and organic solvents which are merits of polyvinyl alcohol. In addition, the composition can compensate for problems of each component in their complementary. Also, because the composition resin of polyolefin/polyvinyl alcohol of the present invention has a unique morphology, it can significantly enhance barrier properties against gases and organic solvents and water resistance. It can be melt processed in a conventional processing machine and provides excellent and cheap barrier films as compared to the expensive EVOH. In such a case where these films are used in a part of a multi layer article, it is possible to reduce the number of processing steps because it does not require the use of adhesives. Meanwhile, the principle of multi layer film can be applied to multi layer sheets or containers and, therefore, excellent physical properties and cost reduction can be obtained in the field requiring barrier properties. These films, multi layer films, sheets, containers, etc., can be used in various fields, for example, for packaging foods, medicines and agricultural chemicals and for storing paints, fuels of automobiles and a large quantity of chemicals.

What is claimed is:

1. A composition for use in forming a material having barrier properties against gases and organic solvents, the composition comprising:

(A) 30 to 80% by weight of polyolefin and 20 to 70% by weight of polyvinyl alcohol, (B) based on 100% by weight of polyolefin, 3 to 30% by weight of high molecular compatibilizer or 0.1 to 5% by weight of low molecular compatibilizer or both, (C) 3 to 50% by weight of plasticizer based on 100% by weight of polyvinyl alcohol, (D) 1 to 10% by weight of a processing aid based on 100% by weight of polyvinyl alcohol, and (E) 0.01 to 5% by weight of antioxidant based on 100% by weight of polyvinyl alcohol.

2. The composition according to claim 1, wherein said processing aid is one or a mixture of at least two selected from the group consisting of acrylic oligomers, phosphates, calcium stearate, zinc stearate, magnesium stearate, stearic acid, paraffin wax and polyethylene wax;

said antioxidant is one or a mixture of at least two selected from the group consisting of sterically hindered phenolic antioxidants, phosphate-based antioxidants, calcium/zinc/tin-based organic mixture antioxidants, dioctyltin maleate-based antioxidants and dioctyltin mercaptide-based antioxidants;

said high molecular compatibilizer is one or a mixture of at least two selected from the group consisting of ethylene-acrylic acid copolymer, ethylene-methacrylic acid copolymer, ethylene-ethylacrylate copolymer, ethylene-alkylacrylate-acrylic acid copolymer, ethylene-alkylmethacrylate-methacrylic acid copolymer, ethylene-butylacrylate copolymer and ethylene-vinylacetate copolymer, or modified compounds thereof; and said low molecular compatibilizer is one or a mixture of at least two selected from the group consisting of acrylic acid, methacrylic acid, maleic acid, fumaric acid, itaconic acid, crotonic acid, sorbic acid and anhydrides thereof, and vinyltrimethoxy silane, vinyltrismethoxyethoxy silane, vinyltriethoxy silane, g-(meth)acryloxypropyl trimethoxy silane, g-(meth)acryloxypropyltriethoxy silane, viiiyl-tris(b-methoxyethoxy) silane and vinyltriacetoxy silane.

3. The composition according to claim 1, wherein 0.01 to 0.5% by weight of an initiator that causes a reaction between the compatibilizer and the polyolefin is added to the composition based on 100% by weight of polyolefin, and said initiator comprises one or a mixture of at least two selected from the group consisting of acyl peroxide, di-alkyl or di-aryl peroxide, peroxy ester, hydro peroxide, ketone peroxide and azo compound initiator.

4. The composition according to claim 2, wherein said high molecular compatibilizer is an ethylene-ethylacrylate copolymer modified with maleic anhydride.

5. A cast or blown film having barrier properties against gases and organic solvents which is prepared by extruding the composition according to claim 1.

6. A stretched film prepared by biaxially stretching the film according to claim 5.

7. A multi layer film comprising the cast or blown film of claim 5 and at least one layer of polyolefin, modified polymer of polyolefin or a resin in which polyolefin is blended with another polymer on one side or both sides of the cast or blown film.

8. The multi layer film according to claim 7, wherein said multi layer film is biaxially stretched.

9. The multi layer film according to claim 7, which has an additional paperboard layer on the at least one layer on one side or both sides of the cast or blown film.

10. An article having barrier properties against gases and organic solvents, prepared by forming the composition according to claim 1 into said article.

11. The article according to claim 10, wherein the article is formed by melt extruding the composition.

12. A multi layer article prepared by forming the composition according to claim 1 into the article, said article having barrier properties against gases and organic solvents.

13. The multi layer article according to claim 12, wherein the article is formed by melt extruding the composition.

* * * * *